Figure 1:
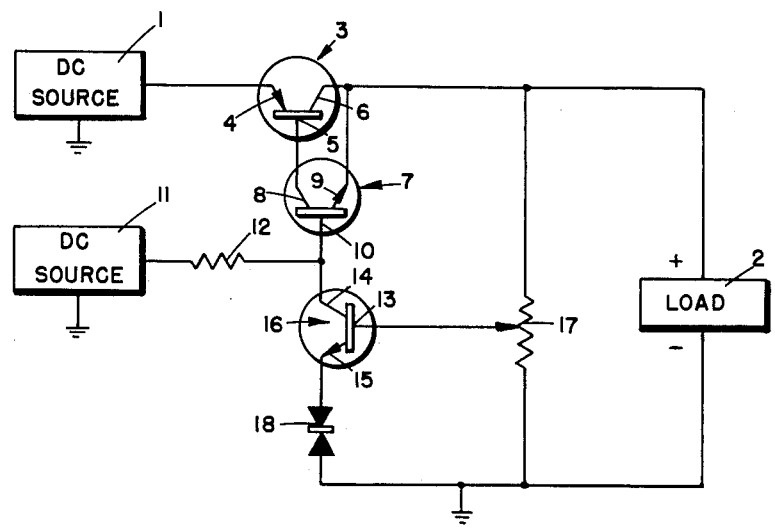

May 16, 1961 G. N. KLEES 2,984,779
TRANSISTORIZED VOLTAGE REGULATED POWER SUPPLY
Filed July 2, 1956 2 Sheets-Sheet 1

*INVENTOR.*
GEORGE N. KLEES
BY
ATTORNEY

May 16, 1961 G. N. KLEES 2,984,779
TRANSISTORIZED VOLTAGE REGULATED POWER SUPPLY
Filed July 2, 1956 2 Sheets-Sheet 2

INVENTOR.
GEORGE N. KLEES
BY
William R Lane
ATTORNEY

United States Patent Office 2,984,779
Patented May 16, 1961

2,984,779

TRANSISTORIZED VOLTAGE REGULATED POWER SUPPLY

George N. Klees, Bellflower, Calif., assignor to North American Aviation, Inc.

Filed July 2, 1956, Ser. No. 595,329

7 Claims. (Cl. 323—22)

This invention relates to voltage regulated power supplies and more particularly to a transistor circuit for controlling the supply of current from a source to a load to minimize changes in the load voltage.

Precise voltage regulation devices are used extensively in electronic circuits which require minimum changes in load voltage. The purpose of voltage regulation is to keep the voltage supplied to the load constant for changes in load current or changes in input voltage, both of which tend to change the output voltage. In order to minimize these changes, an electronic circuit is employed which senses a deviation in load voltage and returns the output voltage to a predetermined regulated value.

It is conventional in voltage regulation to employ electronic tubes in series with the load and to control the flow of current therein by applying a regulatory signal proportional to the change in load voltage to the control grid of this tube. The series type voltage regulator, which utilizes the electronic tube described above, can be designed to give a low internal impedance and low noise output, desirable characteristics in any voltage regulated power supply, but is limited in load capacity by the physical size of the electronic vacuum tube and the inherent inability of a vacuum tube to withstand large current surges and transients in the circuit. Another type of voltage regulated circuit is one which utilizes magnetic amplifier circuits. Regulators utilizing magnetic amplifiers have a high noise level and relatively poor internal impedance characteristics. Heavy filter components and additional vacuum tubes are required to attain the required load noise level and internal impedance characteristics required in the more precise electronic circuits of today.

The present invention contemplates a transistorized voltage regulator whose performance is a marked improvement over past vacuum tube and magnetic amplifier type voltage regulators. The internal impedance of the circuit, due to the inherent characteristics of a transistor in series with the load and input voltage, is extremely low and limited only by connector and wire resistances. In addition, the transistorized circuit is designed to accommodate loads up to 4 amps.

Some of the advantages of transistors over vacuum tubes and magnetic amplifiers are small size, ruggedness, long life, and ability to operate on small power consumption. A transistor has a life expectancy many times that of the vacuum tube, and in addition requires no heater power which results in a marked savings in power supply to the transistor. Operation of a transistor is in some respects similar to the functioning of a vacuum tube triode. The emitter, base, and collector of the transistor may be likened to the plate, grid, and cathode of the vacuum tube triode. Both devices use one electrode to control the flow of current through the other two electrodes. In other respects the two devices are quite different. In operating a transistor of the N-P-N type a positive potential is applied to the collector and a negative potential is applied to the emitter, each with respect to the base. For a P-N-P type transistor, polarities opposite to those of the N-P-N type are applied. Moreover, the characteristics of a transistor vary much more with temperature change than do those of the vacuum tube. In order to compensate for these temperature changes additional circuits must be designed. In the apparatus of this invention a simplified transistor circuit is employed which provides excellent voltage regulation independent of temperature changes and input voltage supply.

It is therefore an object of this invention to provide a regulated power supply having low internal impedance.

It is another object of this invention to provide a regulated power supply with improved noise characteristics.

It is still another object of this invention to provide a regulated power supply utilizing a negative feedback circuit to a transistor amplifier.

It is still another object of this invention to provide a transistor regulated power supply with improved regulation.

It is a further object of this invention to provide a transistor regulated power supply independent of changes in the voltage of the load.

It is still a further object of this invention to provide a transistor regulated power supply which is low in ripple voltage and high in frequency response.

It is a still further object of this invention to provide a voltage regulated power supply which is capable of passing high currents.

It is still another object of this invention to provide a transistor voltage regulated power supply independent of temperature changes.

Figure 2:
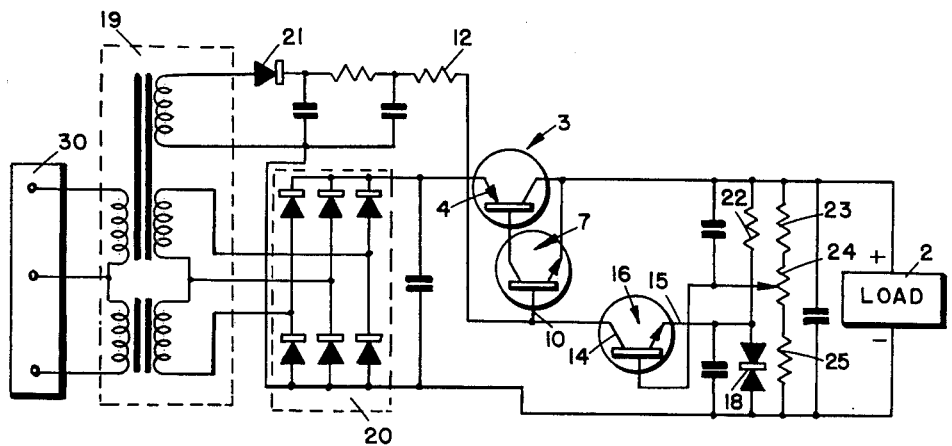
Figure 3:
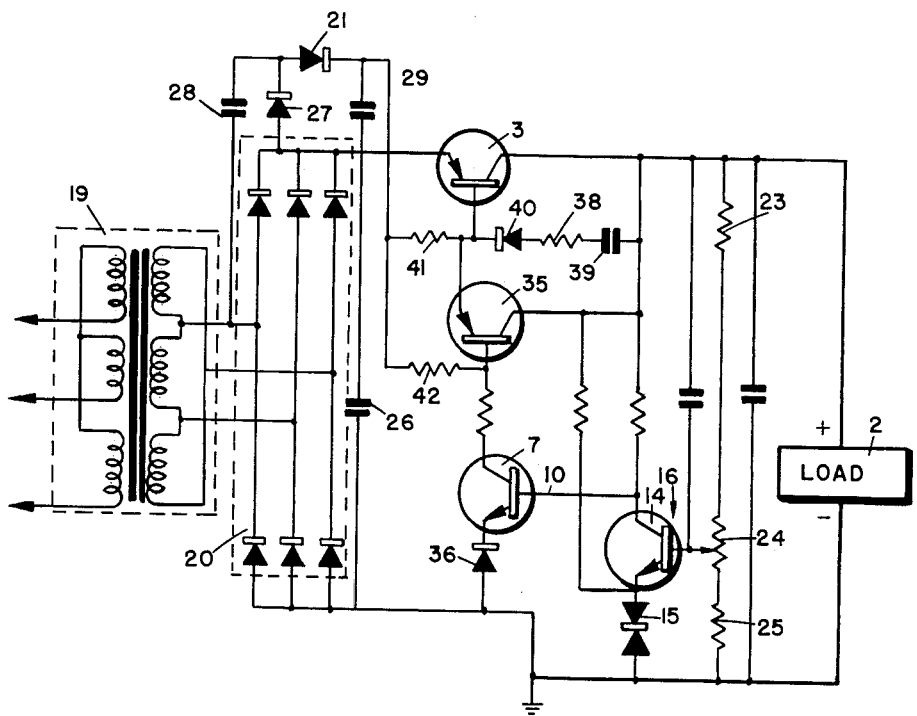

Other objects of invention will become apparent from the following description taken in connection with the accompanying drawings, in which Figs. 1 to 3 are schematic diagrams of circuits embodying the invention.

Referring now to the drawings, there is shown in Fig. 1 a circuit for supplying current from direct current source 1 to a load 2 which may vary. Current source 1 may be any direct current unregulated voltage source. In series with current source 1 and load 2 and placed between them is current regulating device 3 which is a transistor of the P-N-P type comprising an emitter 4, a base 5, and a collector 6. In a P-N-P type transistor the emitter should be at a positive potential with respect to the base, and the collector should be at a negative potential with respect to the base. To maintain emitter 4 at a positive potential with respect to base 55, the positive terminal of direct current source 1 is connected to emitter 4. Connected in cascade arrangement with transistor 3 is transistor 7 which is of the N-P-N type having its collector 8 connected to base 5 of transistor 3 and its emitter 9 connected to collector 6 of transistor 3. Transistor 7 operates as a driver of transistor 3 and the combined gain of transistor 3 and transistor 7 is equal to the product of the individual gains of the respective transistors. Connected to transistor 7 to supply the base current therefor is a series circuit comprising direct current source 11 and resistor 12 connected to base 10 of transistor 7. D.-C. source 11 also supplies the necessary bias current to transistor 3 through transistor 7 to reduce the collector leakage current caused by a rise in temperature. Also connected to base 10 and resistor 12 is collector 14 of transistor 16 which is of the N-P-N type. Base 13 of transistor 12 is connected to an intermediate point on resistor 17. Resistor 17 in turn is connected in parallel with load 2, and the voltage drop across resistor 17 varies in proportion to the voltage drop across load 2. Transistor 16 operates as the sensing amplifier to detect changes in voltage across load 2. A constant voltage reference is provided for transistor 16 by voltage reference 18 which has one end connected to emitter 15 and the other end to ground. Voltage reference 18 is shown as a zener diode and may also be of any other similar type of constant voltage device.

In Fig. 1 current flows from the common connection of the collector of transistor 3 and positive terminal of load 2 through a portion of resistor 17 to base 13 of transistor 16, from base 13 to emitter 15, and through constant voltage reference 18 to ground. Current source 11 also supplies current to transistor 16 thorugh resistor 12, into collector 14, through emitter 15, to voltage reference 18, and then to ground. In transistor 16 the current flowing through emitter 15 is equal to the current flowing in collector 14 plus the current flowing in base 13. The current in collector 14 is equal to the current in base 13 multiplied by the current gain of transistor 16. Any increase in base 13 current of transistor 16 causes a proportionate increase in collector 14 current. The current flowing from base 13 through emitter 15 of transistor 16 is dependent on the voltage of emitter 15 with respect to base 13. Initially this emitter to base voltage is established by voltage reference 18 which is established at the operating voltage of the load to be regulated. When the voltage across load 2 is equal to the reference voltage, the current flowing in base 13 and through emitter 15, which is determined by voltage reference 18, causes a proportionate current to flow in collector 14. The current flowing in collector 14 determines the current flowing in base 10 of transistor 7 since the current from supply source 11 through resistor 12 is apportioned through base 10 and collector 14. The current through base 10 plus the current through collector 14 equals the current through resistor 12. The current flowing in base 10 in turn determines the flow of current in collector 8. The current flowing in collector 8 is equal to the current flowing in base 5. The current flowing from emitter 4 through collector 6 to load 2 is determined by the current in base 5. This current, therefore, is of such value as to provide a voltage drop across load 2 equal to the reference voltage established by device 18.

Assuming an increase in voltage across load 2, the voltage across resistor 17 increases proportionately; the voltage from the portion of resistor 17 connected to base 13 to ground also increases in proportion to the increase across load 2. This increase in voltage causes the emitter 15 voltage to become more negative with respect to the base 13 voltage, resulting in an increase in base 13 current. The current through collector 14 increases in proportion to the increase in base 13 current, causing an increase in current through resistor 12. The increase in current through resistor 12 and collector 14 causes a decrease in current in base 10 of transistor 7. As the current in base 10 decreases, the current in collector 8 decreases proportionately. Since the current in base 5 of transistor 3 is equal to the current through collector 8, current in base 5 also decreases. Decrease of current in base 5 causes a proportionate decrease in current in collector 6 of transistor 3. This decrease in current, which is connected to load 2, causes the voltage across load 2 to decrease, thus tending to return the voltage to the reference voltage. Similarly, a decrease in voltage across load 2 causes a decrease in emitter to base voltage of transistor 16 decreasing the collector 14 current, which in turn causes an increase in base 10 current. Collector 8 current increases proportionately, and base 5 current increases to equal collector 8 current. The increase in base 5 current causes an increase in the current flowing from collector 4 through emitter 6 to load 2, thereby tending to increase the voltage across load 2 to meet the required operating voltage.

In Fig. 2 is shown a transistor voltage regulated power supply having an A.-C. source. Emitter 15 of transistor 16 is connected to the common terminal of resistor 22 and constant voltage reference 18, which is connected in series across load 2 to provide a more stabilized voltage reference. The unregulated input voltage source to load 2 is supplied from three phase source 30, which is reduced in voltage by transformer 19 and rectified by rectifier circuit 20, to provide a direct current voltage to emitter 4 of transistor 3. The current source for base 10 of transistor 7 and collector 14 of transistor 16 is supplied from transformer 19 through rectifier 21 and resistor 12. Operation of the voltage sensing transistor 16, driver transistor 10, and current regulating transistor 3, is similar to the circuit in Fig. 1. The voltage across load 2 is sensed by the resistor network comprising resistors 23, 24, and 25, and compared in transistor 16 to the reference voltage established by voltage reference 18. The difference in the voltage across a portion of the resistor network of resistors 23, 24, and 25, proportional to the voltage across load 2, and the voltage across reference 18, is amplified by transistor 16. The amplified difference, or error voltage, is applied to base 10 of driver transistor 7, which in turn determines the current through transistor 3 and thus the voltage across load 2.

In Fig. 3, transformer 19, rectifier circuit 20 and capacitor 26 form a three phase unregulated power supply. Rectifiers 27 and 21, and capacitors 28 and 29, form a voltage doubler circuit which provides a high voltage source to supply bias current through resistors 41 and 42 to the base of transistors 3 and 35. Supplying a bias current to the base of a transistor reduces the leakage current flowing from the emitter to the collector, thereby allowing operation of the voltage regulator at very small load currents. The voltage of load 2 is sensed by resistor network comprising resistors 23, 24, and 25, and a portion of the voltage across the resistor network is compared to a voltage established by voltage reference 15. The error signal produced when load voltage differs from the reference voltage is amplified by transistor 16 and further amplified by transistor 7, which has its base 10 connected to collector 14 of transistor 16. The emitter to base potential of transistor 7 is fixed by voltage reference 36. The amplified error signal produced by transistor 7 is then applied to the base of transistor 35 which is of the P-N-P type. Transistor 35 having its emitter 37 connected to base 1 of transistor 3 determines the current flowing through the emitter and collector of transistor 3 to load 2, thereby controlling the voltage across the load. Rectifier 40 in series with resistor 38 and capacitor 39 connected at the plate end of the rectifier to base 1 of transistor 3, and connected at the capacitor end to collector 14 of transistor 16, act to prevent damage to transistor 3 during the time when the power supply is turned on. A surge in voltage occurring when the power supply is initially put into operation will discharge through rectifier 40, resistor 38, and capacitor 39. Rectifier 40 is established at a value which prohibits current flow through the rectifier during steady state voltages.

The circuit shown in Fig. 1, having a direct current source, and the three phase supply circuits shown in Figs. 2 and 3, provides a regulated power supply which will supply a load current of ranges from zero to 4 amps. limited in maximum range only by the characteristics of the P-N-P transistor 3 which controls the current flowing from the unregulated source to the load. By providing a bias current to the base of transistor 3, the inherent collector leakage current in the transistor increased by a rise in temperature is greatly minimized. For this reason, voltage regulated power supply circuits providing small currents may be designed utilizing the circuits of this invention.

The P-N-P type transistors 3 and 35, and the N-P-N type transistors 7 and 16, were chosen because of state of design in transistors at the time of invention. It is to be noted that upon improvement in the state of the art, P-N-P type transistors and N-P-N transistors can be used interchangeably, modifying the circuit only to account for changes in polarity.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In combination a first transistor having a collector, an emitter, and a base, means for supplying current from a first source through the emitter-collector path of said first transistor to a load, a second transistor connected to drive said first transistor, a third transistor having a collector, an emitter, and a base, the collector of said third transistor connected to the base of said second transistor, means for supplying current from a second source through a circuit connecting the collector and base of said third transistor, means for impressing a potential across the emitter-base of said third transistor having variations proportional to load voltage changes, and means for deriving from the collector-base circuit of said third transistor and impressing between the collector and base of said first transistor a voltage for controlling the current supplied to said load, said last-mentioned means including means for limiting the voltage impressed between the collector and base of said first transistor.

2. In combination a first, second, and third transistor each having a collector, an emitter and a base, means for supplying current from a first source through the emitter-collector path of said first transistor to a load, said second transistor connected to said first transistor in cascade arrangement, means for supplying current from a second source through the collector base circuit of said third transistor, said second source connected to supply current to the base of said second transistor, means responsive to variations of the voltage of said load for varying the emitter to base potential of said third transistor, means responsive to the collector base circuit of said third transistor for varying the collector-emitter current of said second transistor and means for deriving from the collector-emitter circuit of said second transistor and impressing between the collector and base of said first transistor a voltage for controlling the current supplied to said load.

3. In combination a first, second and third transistor, each having a collector, an emitter and a base, means for supplying current from a first source through the emitter-collector path of said first transistor to a load, means for supplying current from a second source to the base of said second transistor, means responsive to variations of voltage of said load for varying the emitter to base potential of said third transistor, means for conductively connecting said second transistor with said third transistor, and means for deriving from the collector-emitter circuit of said second transistor and impressing between the collector and base of said first transistor a voltage for controlling the current supplied to said load.

4. In combination a first, second, and third transistor, each having a collector, an emitter and a base, means for supplying current from a source through the emitter-collector path of said first transistor to a load, said first and second transistors conductively connected in cascade arrangement, means connecting the base of said second transistor and the collector of said third transistor in common to a source of potential, means responsive to variations of voltage of said load for varying the emitter to base potential of said third transistor, means for deriving from the collector-base circuit of said third transistor and impressing between the collector and base of said first transistor a voltage for controlling the current supplied to said load, and storing means conductively connected between the collector and base of said first transistor for limiting the voltage impressed between said collector and base.

5. In combination a first transistor having an emitter, a base, and a collector, means for supplying current from a first current source through the emitter-collector path of said first transistor to a load, a second transistor connected to drive said first transistor, a third transistor connected to a second current source through a circuit connecting the collector and base of said third transistor, means for impressing upon the emitter with respect to the base of said third transistor a potential varying with the change in load potential, means responsive to the collector-base circuit of said third transistor to impress between the collector and base of said first transistor a voltage for controlling the current supplied to said load, and means for limiting the voltage impressed between the collector and base of said first transistor.

6. In combination a first transistor having an emitter, a base, and a collector, means for supplying current from a first source of potential through the emitter-collector path of said first transistor to a load, a second transistor having an emitter, a base, and a collector, the emitter and collector of said second transistor connected to the collector and base respectively of said first transistor, a third transistor having an emitter, a base, and a collector, the collector of said third transistor connected in common with the base of said second transistor to a second source of potential, a resistor and a constant voltage device connected in series across said load, means for connecting the emitter of said third transistor to a common terminal of said resistor and said constant voltage device, resistance means connected across said load having a terminal intermediate its end terminals, and means for connecting the base of said third transistor to said intermediate terminal.

7. A voltage regulated power supply comprising a first source of D.-C. potential, a load circuit, a variable impedance transistor device having a collector, base, and emitter connected in series between said first D.-C. source and said load, a transistor amplifier stage including at least a transistor having an emitter, a collector, and a base, said amplifier transistor connected to drive said variable impedance transistor, a second D.-C. source connected to supply bias current to the base of said transistor amplifier, sensing means comprising at least a transistor having an emitter, a collector and a base to sense the voltage across said load, and means responsive to said sensing transistor for applying a potential to said variable impedance device proportional to the potential applied to said load circuit, and means connected across the base and collector of said variable impedance device to limit the potential applied by said means responsive to said sensing transistor.

References Cited in the file of this patent

UNITED STATES PATENTS

| 2,693,568 | Chase | Nov. 2, 1954 |
| 2,751,545 | Chase | June 19, 1956 |
| 2,751,549 | Chase | June 19, 1956 |
| 2,751,550 | Chase | June 19, 1956 |
| 2,832,034 | Lilienstein et al. | Apr. 22, 1958 |
| 2,832,035 | Bruck et al. | Apr. 22, 1958 |